United States Patent
Lescoche

(10) Patent No.: US 8,240,482 B2
(45) Date of Patent: Aug. 14, 2012

(54) TANGENTIAL FILTRATION DEVICE

(75) Inventor: Philippe Lescoche, Faucon (FR)

(73) Assignee: Societe Industrielle de la Vallee de l'Aigues S.I.V.A., Nyons (FR)

( * ) Notice: Subject to any disclaimer, the term of this patent is extended or adjusted under 35 U.S.C. 154(b) by 590 days.

(21) Appl. No.: 12/309,409

(22) PCT Filed: Jul. 16, 2007

(86) PCT No.: PCT/FR2007/051667
§ 371 (c)(1),
(2), (4) Date: Jun. 22, 2009

(87) PCT Pub. No.: WO2008/009848
PCT Pub. Date: Jan. 24, 2008

(65) Prior Publication Data
US 2009/0314695 A1    Dec. 24, 2009

(30) Foreign Application Priority Data

Jul. 17, 2006 (FR) .................................... 06 52992

(51) Int. Cl.
*B01D 29/00* (2006.01)
*B01D 29/52* (2006.01)

(52) U.S. Cl. ............. 210/416.1; 210/323.2; 210/321.79; 210/321.88; 210/433.1; 210/87; 210/189

(58) Field of Classification Search ........................ None
See application file for complete search history.

(56) References Cited

U.S. PATENT DOCUMENTS

| | | |
|---|---|---|
| 3,369,667 A | 2/1968 | Clark et al. |
| 3,708,069 A | 1/1973 | Clark |
| 3,893,920 A | 7/1975 | Hubbard et al. |
| 4,239,624 A | 12/1980 | van Zon |
| 4,498,990 A | 2/1985 | Shaldon et al. |
| 4,702,842 A | 10/1987 | Lapierre |
| 5,096,583 A | 3/1992 | Roux et al. |
| 6,059,970 A | 5/2000 | Kohlheb et al. |
| 6,161,435 A | 12/2000 | Bond et al. |
| 6,547,965 B1 | 4/2003 | Chancellor |
| 7,192,522 B2 | 3/2007 | Grangeon et al. |

(Continued)

FOREIGN PATENT DOCUMENTS

DE         33 23 725         12/1983

(Continued)

*Primary Examiner* — Krishnan S Menon
*Assistant Examiner* — Dirk Bass
(74) *Attorney, Agent, or Firm* — Clark & Brody

(57) ABSTRACT

The present invention relates to a device for tangential filtration of a fluid to be treated and to be separated into a filtrate and a retentate, comprising at least one filtration element which comprises at least one inlet for a fluid to be filtered and at least one outlet for the retentate having circulated the filtration element, wherein said element is incorporated in a circulation loop so that at least a part of the retentate is reinjected into the fluid to be treated before being introduced into the filtration element. a module of filtration into which the circulation loop is integrated and realized by a series of filtration elements in forward direction and a series of filtration elements in backward direction, forming forward and backward circuits. At least one probe for detecting information which is characteristic for the fluid to be filtered and representative for the risks of gelification of the fluid to be filtered in the filtration element(s) and/or for the risks of total obstruction of the filtration element(s).

15 Claims, 6 Drawing Sheets

U.S. PATENT DOCUMENTS

| | | |
|---|---|---|
| 2004/0007517 A1 | 1/2004 | Grangeon et al. |
| 2004/0266017 A1 | 12/2004 | Chun et al. |
| 2007/0023340 A1 | 2/2007 | Lescoche |
| 2007/0051675 A1* | 3/2007 | Lindh et al. .................. 210/605 |

FOREIGN PATENT DOCUMENTS

| | | |
|---|---|---|
| EP | 0 217 568 | 4/1987 |
| EP | 0 448 466 | 9/1991 |
| FR | 2 810 256 | 12/2001 |
| JP | 4-371218 | 12/1992 |
| JP | 10-109022 | 4/1998 |
| WO | 81/02835 | 10/1981 |
| WO | 98/36824 | 8/1998 |
| WO | 98/57732 | 12/1998 |
| WO | 01/96003 A1 | 12/2001 |
| WO | 2004/067146 A1 | 8/2004 |

* cited by examiner

TANGENTIAL FILTRATION DEVICE

The present invention concerns the technical area of molecule or particle separation using separating elements generally called membranes, adapted to ensure the separation of molecules or particles contained in a liquid medium to be treated.

The object of the invention finds particularly advantageous application in the general meaning of the filtration of liquids to be treated, and in particular nanofiltration, ultrafiltration, microfiltration, etc.

By liquid medium to be treated is particularly meant a liquid medium such as milk, wine, water, fruit juices, sugar and its derivatives . . . .

In the state of the art, numerous variants of embodiment are known of a filtering installation for a liquid to be treated. Some of these installations notably use tangential filtration and incorporate a circulation loop. Tangential filtration consists of causing the liquid to be treated to circulate parallel to a porous membrane. Since the liquid to be treated circulates at high speed on the surface of the membrane, a shear stress is generated which redisperses the matter deposited on this surface, thereby limiting the accumulation of particles on the surface of the membrane and delaying fouling thereof.

The liquid to be treated "rubs" on the surface of the membrane, which leads to a pressure drop (head loss) which varies in a linear fashion in relation to the length of the membrane. This pressure drop is dependent on size parameters of the membrane: the length of the membrane and its hydraulic diameter; and on experimental parameters: circulation rate, product viscosity, density.

A tangential filtration device comprises at least one filtering element which contains a porous membrane delimiting a circulation chamber for the liquid to be filtered and a chamber to collect the filtrate after it has passed through the membrane. The filtering element comprises at least one, and most often only one, inlet for the liquid to be treated, at least one and most often only one outlet for the retentate which has circulated along the filtering element. The space in which the filtrate is collected communicates with at least one and most often only one outlet for the filtrate. The filtrate is clarified, whereas the retentate corresponds to a concentrate of the liquid to be treated, in the form of particles which were unable to pass through the pores of the filtering element. Said devices most often include a circulation loop i.e. the retentate is reinjected at least in part before entry into the filtering element, so as to carry out successive re-concentrations and thereby avoid too much waste.

The membranes consist of a support whose surface, on which the liquid to be treated circulates, is coated with a filtering layer of narrow thickness. These membranes may be of organic type i.e. made from one or more organic polymers such as polysulfones, polyethersulfones, polyamides, vinyl polyfluorides. The membranes can also be of inorganic type, these being preferred in the invention, consisting of layers of porous ceramics, e.g. carbon, zirconium, aluminium oxide or titanium oxide.

The membranes may have different geometries, e.g. planar or tubular. In general, several membranes are placed in a module or casing.

Said filtration device comprises at least one filtering module which encases a series of filtering elements of tubular shape extending parallel to each other and mounted sealingly, at each of their ends, on a positioning plate. Each filtering element comprises at least one circulation channel for the liquid to be filtered. The filtering elements ensure the tangential filtration of the liquid with a view to obtaining the outgoing filtrate on the peripheral surface of the filtering elements, which is intended to be collected in a collection space positioned between the positioning plates and the casing.

According to a first variant of the prior art, the filtration device is mounted inside a circulation loop in which a circulator pump is connected to the filtration device via an intake channel, bringing the liquid to be filtered, and a feed channel supplying the liquid to be treated into which a return channel leads which recovers part of the liquid which has circulated inside the filtering elements called the retentate. The circulator pump also ensures fast rate circulation of the liquid to be filtered inside the filtering elements, which tends to generate a shear stress which redisperses the matter deposited on the surface of the membrane channels.

Other filtration devices, for example those described in patent applications FR 2 810 256 and WO 01/96003, comprise a circulation loop directly integrated in the casing.

Said device has the advantage of reducing considerably the total capture volume of the device, and in particular the capture volume corresponding to the liquid to be treated, the immediate consequence being a reduction in the contact time inside the device. This reduction in contact time reduces heating of the liquid inside the system.

Irrespective of the configuration of the system, it is necessary for tangential operation that the experimental conditions which allow non-fouling of the filter are given heed during the operating cycle of the installation.

Numerous theories endeavour to predict the permeate flux in a membrane device. One of these defines the thickness of the laminar sub-layer of a turbulent flow as being the chief parameter. It effectively appears obvious that the thickness of the matter deposited on the surface of the membrane cannot exceed the thickness of the laminar sub-layer. This sub-layer therefore represents the thickness of the retained filter cake. It is therefore reasonable to estimate that the thinner this sub-layer, the higher the permeability of the membrane.

The equation which gives the thickness of the laminar sub-layer is the following:

$$\chi = k \times \frac{v}{(\tau_\omega / \rho)^{\frac{1}{2}}}$$

in which:
$\chi$=thickness of the laminar sub-layer
$v$=kinematic viscosity of the liquid to be filtered
$\rho$=density of the liquid to be filtered
$\tau_\omega$=wall shear
$k$=coefficient The value of wall shear is given by the following equation:

$$\tau_\omega = \frac{\lambda}{8} \times \rho \times V_L^2$$

in which:
$\lambda$=coefficient of friction
$V_L$=rate of circulation of the liquid to be filtered
The value of the coefficient of friction is given by the following equation:

$$\lambda = 0.316 \times R_e^{-0.25}$$

in which $R_e$ is the Reynolds number of the liquid to be treated. This number equals:

$$R_e = \frac{2 \times \rho \times V_L \times R}{\eta}$$

in which:
R=hydraulic radius of the channel in which the liquid to be treated circulates,
η=dynamic viscosity of the liquid to be filtered.

It therefore appears that, to evaluate the non-fouling of a membrane under tangential operation, the following must be taken into account:
  the circulation rate,
  the density of the liquid to be filtered,
  dynamic viscosity and kinematic viscosity (the latter being equal to dynamic viscosity divided by density).

During functioning of the membrane, some species are retained and others pass through the membrane depending on its cut-off power. Evidently, the concentration of the retained species increases, resulting in increased viscosity and density of the liquid circulating along the membrane.

Under these conditions:
  the Reynolds number decreases,
  the coefficient of friction increases,
  pressure drop (head loss) increases,
  wall shear becomes higher,
  the thickness of the laminar sub-layer is reduced, promoting an increase in permeability.

The increase in viscosity and density should result in an increase in permeability. In practice, however, it is the contrary which occurs. Said predicted increase in permeability with the increase in viscosity and density is cancelled out by the operation of the circulator pump. For cost reasons, this pump is very frequently of centrifugal type. However, centrifugal pumps have operating curves which define the flow rate of the pump when pressure conditions vary. As a general rule if there is an increased pressure drop, related to friction on the membranes of the liquid to be treated, the circulation speed decreases. The rate of circulation is therefore reduced, the consequence being that:
  the Reynolds number decreases,
  the coefficient of friction decreases,
  pressure drop is reduced,
  wall shear decreases,
  the thickness of the laminar sub-layer increases thereby reducing permeability.

It is to be noted that pressure is not representative of the state of the liquid to be treated inside the filtering element or elements, since one same pressure drop may relate to a fast circulation rate associated with a low viscosity value, or the reverse.

Also, viscosity is the ratio of shear stress inside the liquid (different from wall shear) to the velocity gradient. Yet most often the liquids to be treated, at high concentration levels, have so-called abnormal viscosities. The most frequent consequence of this abnormality is the onset of bulking phenomena in the event of a sudden variation in the velocity gradient. This variation may be the result of a power cut or any other problem whose effect is accidentally to reduce the circulation velocity. In this case, all the liquid to be treated may convert to a gel, and draining the installation becomes a highly time-consuming and costly operation, sometimes even impossible without changing the membranes. The gelling of the liquid to be treated in a membrane tangential filtration device, with circulation loop, is a phenomenon that it is essential to prevent.

Within this context, the inventors have therefore developed a novel device such as defined in claim 1, which uses a method to monitor an installation for the tangential filtration of a liquid to be treated, comprising at least one filtering element along which a liquid to be filtered circulates, the liquid being intended to be separated into a filtrate which has passed through the filtering element and a retentate which has circulated along the filtering element, said element being incorporated in a circulation loop, so that at least part of the retentate is reinjected into the liquid to be treated before it enters the filtering element. According to one essential characteristic of the invention, at least one characteristic item of information is detected concerning the liquid to be treated, representing risks of gelling of the liquid to be treated inside the filtering element(s) and/or risks of complete fouling of the filtering element(s). With the device of the invention, the risks of gelling of the liquid to be treated inside the filtering element(s) and/or of complete fouling of the filtering element(s) are minimized, and are even fully avoided through the detection of a characteristic data item on the liquid to be filtered and its comparison with a threshold value.

The device for the tangential filtration of a liquid to be treated, according to the invention, includes at least one filtering element which comprises at least one inlet for a liquid to be filtered, at least one collection space connected to an outlet to collect the filtrate which has passed through the filtering element, and at least one outlet for the retentate which has circulated along the filtering element, said element being incorporated in a circulation loop so that at least part of the retentate is reinjected into the liquid to be treated before it enters the filtering element. According to one essential characteristic of the invention, this device comprises at least one detection probe to detect characteristic information on the liquid to be filtered relating to the risks of gelling of the liquid to be filtered inside the filtering element(s) and/or of complete fouling of the filtering element(s). This device therefore incorporates a detection probe detecting characteristic information on the liquid to be filtered, which by comparison with a reference value allows assessment of the risks of gelling of the liquid to be treated inside the filtering element(s) and/or of the risks of complete fouling of the filtering element(s) and, in relation to the result of this comparison, allows emergency or safety procedure to be set up if necessary.

The following description, with reference to the appended drawings, provides better comprehension of the invention.

Figure 1A:
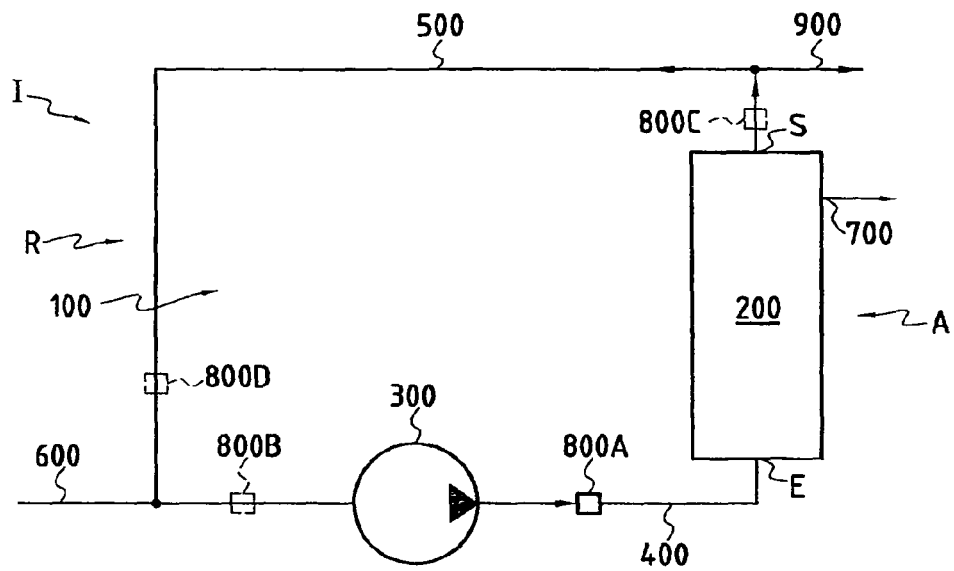
FIGS. 1A, 1B and 2 are diagrams of tangential filtration devices according to the invention.

Under the invention, to prevent a system comprising membranes to operate under conditions in which permeability is low and/or there is a clear risk of gelling of the liquid to be treated, a probe is integrated in the circulation loop, this probe giving reliable information on one of the characteristics of the liquid to be filtered, this information being characteristic of the thickness of the laminar layer present on the surface of the filtering element(s). The detected information is also directly connected with the permeate flux passing through the filtering element. This information is detected regularly throughout the filtering operation. As seen above, said characteristics are notably:
  the circulation rate of the liquid to be filtered,
  the concentration of the liquid to be filtered,
  the viscosity of the liquid to be filtered, and the density of the liquid to be filtered.

Since, right from the start of the first filtering cycles, the liquid to be filtered consists of a mixture of a liquid to be treated and a retentate, on each filtering cycle an increase in viscosity and density is normally ascertained of the liquid to be filtered circulating inside the filtering elements. The detected information can be obtained from a measurement taken on the retentate, or preferably on the liquid to be filtered.

The information given by the probe may be an exact measurement of either one of these characteristics, or it may correspond to information giving indications on either one of these characteristics. The measurement taken may effectively be converted to any type of signal, and the delivered information can either relate to the measurement or it may be obtained using the measurement, one same item of information therefore can possibly correspond to a range of measurements.

It is difficult to measure the viscosity of the liquid to be filtered. When in operation, the velocity gradient along a membrane reaches very high values: in the order of 10 000 s−1. Yet this is used by viscometers to determine the viscosity of a liquid. Since a very high value of the velocity gradient cannot be measured by conventional viscometers, it is very difficult to determine the viscosity value of the liquid to be filtered at the filtering elements.

With respect to concentration, this characteristic is highly dependent on the liquid to be filtered, and it is therefore very difficult to predict a threshold value suitable for a series of liquids of different type. Under the invention, by concentration is meant the ratio between the entire volume of liquid treated during one operating cycle and the volume of concentrate at the end of the operation.

For example, a liquid can be concentrated x times from its initial state. The concentration which can be attained depends on the initial matter content of the liquid to be treated. A wine for example may contain y mg/l of matter to be separated to obtain good turbidity. If prior experiments have shown that from y mg/l, a concentration of 1000 times can be obtained, this means that for a vat of 1000 hl, the final volume will be 100 l. If the following vat contains (y+10) mg/l, the same concentration can lead to the onset of bulking. On account of this variability in initial matter content of a liquid to be treated, the threshold value must be readjusted for each type of liquid.

Concentration, for example, can be determined using two flow meters used to measure the flow of liquid entering the installation and the outgoing flow of permeate, and by determining the ratio between the two flows.

Under the invention, and preferably, the probe detects a characteristic item of information on the density or velocity of the liquid to be filtered.

According to one variant of the invention, it is possible to use at least two different probes, each giving a characteristic measurement of the risks of gelling of the liquid to be filtered inside the filtering element(s) and/or of total fouling of the filtering element(s). It is also possible, in addition to one or more items of information on the liquid to be filtered representing risks of gelling and/or fouling, to detect another characteristic of the liquid to be filtered or of the filtration device. For example it is possible, in addition to the probe conforming to the invention, to use a probe which measures pressure drop for example. Therefore pressure sensors positioned upstream and downstream of the filtering elements can be used to measure pressure drop, and this information can be used to characterize the installation notably in correlation with the circulation rate or density of the liquid to be treated.

The circulation rate can be measured using numerous types of probes. A first type of probe measures the flow rate of the liquid to be filtered, at one point of the device e.g. at the outlet of the circulator pump, and recalculates velocity by dividing by the membrane cross-section. This method assumes the use of flow meters measuring strong flow rates (those of the circulator pump) and is therefore costly. Another type of probe consists of an ultrasound transmitter/receiver system which uses the LARSEN effect for example to recalculate velocity. These probes are much less costly than the above-mentioned probes, but only determine velocity at the point where they are arranged. They cannot be used therefore to determine the circulation rate inside the membranes, which may be of advantage in some cases. In an even cheaper version, the probe can deliver information which relates to ranges of measurements and not to one specific measurement. This is the case for example with ultrasound probes having a series of diodes, each number of illuminated diodes corresponding to a range of flow rates.

Preferably, an ultrasound probe is used. The probe used may translate measurement of velocity or detected flow rate into any type of signal, in particular an electric or light signal.

Density can also be measured using numerous types of probes. One type of probe consists of an ultrasound transmitter/receiver system. The probe can take accurate measurements or can deliver information obtained from a measured signal, one same item of information possibly corresponding to a range of measurements.

Whichever probes are used, it is important that the information delivered by a probe should represent the characteristic of the selected liquid to be filtered, and in particular the density or circulation rate of the liquid to be filtered.

Under the invention, provision may be made to compare the information provided by a probe with a threshold value, the result of the comparison determining the triggering or non-triggering of safety procedure. This safety procedure may, for example, consist of halting the device, draining the device or rapid rinsing with water. In this case, the device comprises triggering means to trigger emergency procedure, which are actuated in relation to the information detected by the probe and its ranking relative to the alert threshold.

The threshold value is determined previously, for example experimentally by conducting several filtration cycles with different liquids to be treated which are to be filtered on the installation. For example, for each test the value of the measured characteristic is determined, which may for example relate to a drop in permeate flux, and the threshold value is chosen so that in all tests its timing comes before this drop in permeate flux, with a certain safety margin. It is also possible for one same installation to determine several threshold values, each one being adapted to a type of permeate, for example rosé wine from cellar X, rosé wine from cellar Y, red wine from cellar X, red wine from cellar Y . . . .

The probe or probes must be positioned in the device, inside the circulation loop, so as to allow detection of the desired information concerning the liquid to be filtered which is to circulate in the filtering element(s). The circulation loop is equipped with a circulator pump ensuring circulation of the liquid inside the loop. FIG. 1A shows a filtering device I comprising a circulation loop 100 in which a tangential filtration module 200 is integrated, which comprises several filtering elements. A circulator pump 300 is positioned outside the module and ensures circulation of the liquid inside the device. This pump 300 is connected to the filtration module 200 via an intake channel 400 bringing the liquid to be filtered, and a return channel 500 collecting part of the retentate which has circulated inside the filtering elements. The module 200 corresponds to an outward circuit A of the loop and channel 500 to a return circuit R. The remainder of the retentate is eliminated via an evacuation outlet 900, positioned upstream of the filtration module. The liquid to be treated arrives at the pump 300, via a feed channel 600. The return channel 500 for the retentate, upstream of the pump, leads into the feed channel 600. Therefore, right from the first filtration cycles, the liquid to be filtered which circulates in the tangential filtration module contains a mixture of the liquid to be treated and of the retentate. The filtration module can be any type of prior art filtration module e.g. a casing comprising several filtering elements, such as tubular filtration membranes in which the liquid to be filtered circulates tangentially. Each filtering element comprises at least one channel lying parallel to the longitudinal axis of the filtering element. The surface of the channels is coated with at least one separating layer, not illustrated, intended to be in contact with the liquid medium to be treated circulating inside the channels. The type of the separating layer(s) is chosen in relation to the separating or filtering power to be obtained. The filtrate leaving the peripheral surface of the filtering elements is recovered in a collection space.

The filtration module comprises:
an inlet E for the liquid to be filtered, connected to the intake channel 400 bringing liquid to be filtered,
an outlet S to evacuate the retentate, connected to the return channel 500 recovering part of the retentate which has circulated inside the filtering elements, and
an outlet 700 for the filtrate.

Each filtering element, inside the module, is connected to the inlet E for the liquid to be filtered, to the outlet S for the retentate and the collection space collecting the filtrate which has passed through each filtering element at the outlet 700 by the filtrate.

The detection probe(s) are advantageously positioned so as to measure a characteristic of the liquid to be filtered which is to circulate inside the filtering elements contained in the module 200. For this purpose, in the example illustrated FIG. 1A, it is possible to position the probe on the intake channel 400 for the liquid to be filtered, downstream of the pump 300, as illustrated under reference 800A. The probe may also be positioned on the feed channel 600, upstream of the pump 300 and downstream of the arrival of the retentate via channel 500, as illustrated under reference 800B in FIG. 1A.

It could also be contemplated to detect a characteristic of the retentate intended to be reinjected into the liquid to be treated. Since the retentate is the "variable part" of the liquid to be filtered, the other part consisting of the liquid to be treated being the "constant part", the measurement of a characteristic of the retentate, such as the rate of circulation of the retentate or its density is directly related to the corresponding characteristic of the liquid to be treated and is representative of its variations. It could therefore be considered to position the probe on the return channel 500 of the retentate. In one first variant illustrated under reference 800C in FIG. 1A, the probe can be positioned downstream of the outlet S and upstream of the evacuation outlet 900 for part of the retentate. Another variant consists of positioning the probe on the return channel 500 downstream of the evacuation outlet 900 as illustrated under reference 800D in FIG. 1A. The first of these variants is preferred, in particular when the probe detects information on the velocity of the liquid to be treated.

Irrespective of the position chosen for the probe, namely 800A, 800B, 800C or 800D, the information delivered by the probe informs on risks of gelling of the liquid to be filtered inside the filtering elements present in the module and/or on the risks of total fouling of said filtering elements. The risks are evaluated globally for the entire module, and not for each filtering element individually.

Figure 1B:
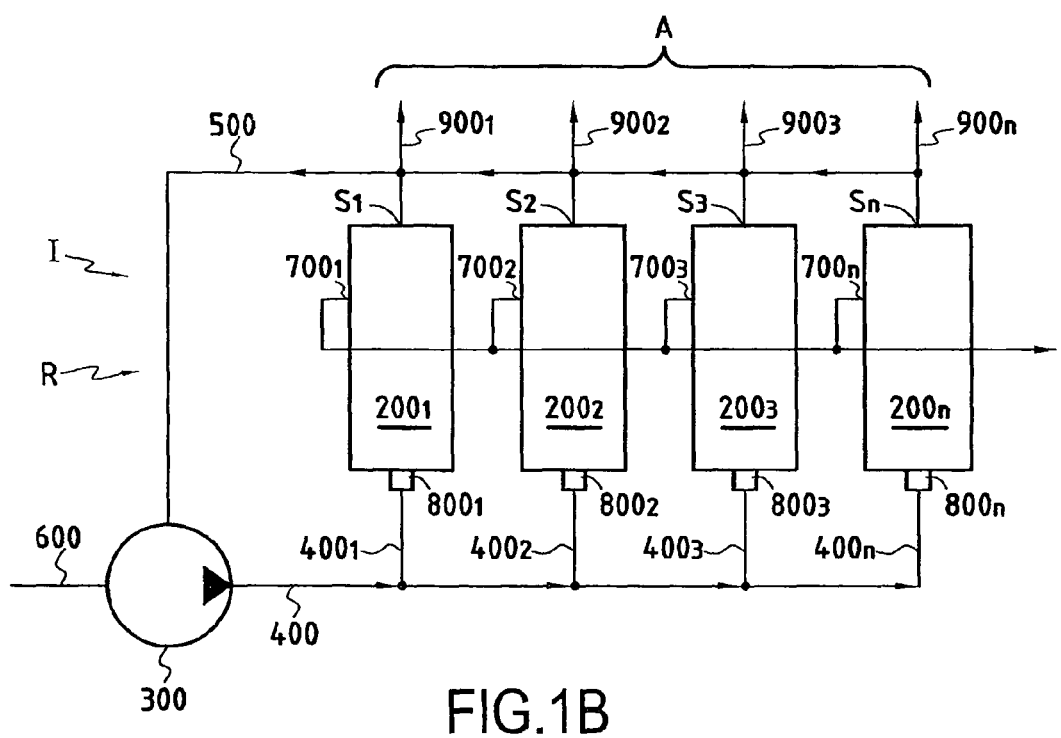

It is also possible for the device I to contain several filtration modules $200_1$ to $200_n$ which correspond to the outward circuit A of the loop as illustrated FIG. 1B. In FIG. 1B, for each module, the outlet references S (outlet for the retentate), 700 (outlet for the filtrate) and 900 (outlet to evacuate part of the retentate), are given the subscript corresponding to each of the modules. If there are several modules arranged in parallel, the intake channel 400 bringing the liquid to be filtered has several branch lines $400_1$ to $400_n$, each connected to the corresponding filtration module. Provision may then be made only to position one probe on channel 400 upstream of the different branch lines. In this case, the detected information is global and represents the risks of gelling and fouling of all the modules and hence of all the filtering elements and not of each module or of each filtering element. One probe ($800_1$ to $800_n$) can also be positioned on each branch line $400_1$ to $400_n$, as illustrated FIG. 1B. On leaving each module, part of the retentate is evacuated via an outlet $900_1$ to $900_n$, the remainder being grouped together and reinjected via the retentate return channel 500 (corresponding to the return circuit R) to undergo a further filtering operation in a mixture with the liquid to be treated supplied by channel 600. According to one non-illustrated variant, one probe could also be positioned, for each module n, on the retentate return channel, between outlet $S_n$ and the evacuation outlet $900_n$ for part of the retentate. These two configurations have the advantage of taking a measurement for each module, which allows a threshold value to be applied to each of the modules which can therefore be monitored independently, thereby increasing the safety level of the installation.

The method of the invention is particularly suitable for monitoring devices in which:
the circulation loop is contained inside the casing,
the circulator pump and its motor are arranged in the continuation of the casing, thereby allowing a homogenous assembly to be obtained without the piping of the circulation loop being apparent.

Figure 2:
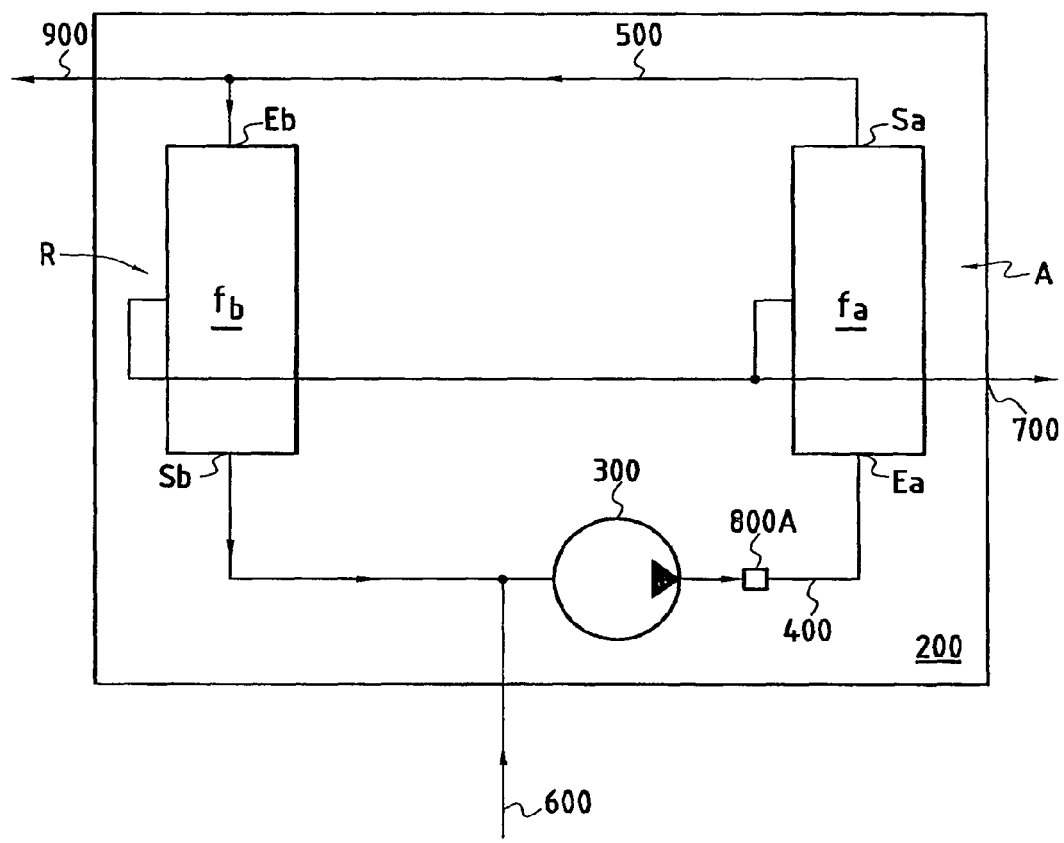

Said devices marketed by SIVA are called tangential integrated systems (TIS). Some of these devices are described in particular in patent applications FR 2 810 256 and WO 01/96003 to which reference may be made for further details. FIG. 2 schematically illustrates a variant of embodiment of a module of TIS type. The loop and the circulator pump are integrated in the module. For reasons of simplification, identical parts to those described with respect to FIGS. 1A and 1B carry the same reference. The module 200 comprises an outward series $f_a$ and a return series $f_b$ of filtering elements forming outward A and return R circuits of a circulation loop for the liquid to be filtered. The filtering elements of the outward series $f_a$ are connected via their inlet Ea to the module inlet for the liquid to be treated, the connection being obtained by intake channel 400 bringing the liquid to be filtered. After circulating tangentially along the filtering elements of the outward series $f_a$, the retentate is evacuated via their outlet Sa. The filtering elements, which each comprise at least one circulation channel for the liquid to be filtered, ensure the filtering of said liquid, with a view to obtaining the outgoing filtrate on the peripheral surface of the filtering elements, this filtrate intended to be collected in a collection space connected to the filtrate outlet 700 of the module. Outlet Sa is connected to inlet Eb of the filtering elements of the return series $f_b$ of filtering elements and, schematically, is positioned on the return channel 500 of the retentate. The retentate leaving via outlet Sb of the filtering elements of the return series $f_b$ is reinjected, at least in part, into the liquid to be treated brought by channel 600. The loop comprises an evacuation outlet 900 for part of the retentate. Part of the retentate can be evacuated:

either, according to one variant not illustrated FIG. 2, downstream of the return series $f_b$ of filtering elements, or downstream of the outward series $f_a$ of filtering elements and upstream of the second return series $f_b$ of filtering elements, as shown FIG. 2.

The liquid circulates inside the module 200 in the direction indicated in FIG. 2. The pump, or at least the turbine of the circulator pump, is positioned on the circulation loop. The turbine 300, according to one variant that is not illustrated, may be positioned downstream of the outward series $f_a$ of filtering elements, but upstream of the return series $f_b$. This relative positioning of the turbine is assumed by a TIS module for example, as described in particular in WO 01/96003 and illustrated FIG. 3A, in which some references of FIG. 2 have been reproduced.

Advantageously, it is possible for the device to be designed so that the pump 300 is positioned between the point into which the feed channel 600 opens and the inlet Ea of the outward series $f_a$ of filtering elements as illustrated FIG. 2. This variant is also illustrated FIGS. 3B and 3C.

With respect to TIS modules, the detection probe is positioned inside the module 200, within the circulation loop. As previously described, the information is preferably obtained from a measurement taken on the liquid to be filtered, for example downstream of the point at which the feed channel 600 of the liquid to be treated and the retentate return channel 400 join together, and upstream of inlet Ea of the filtering elements of the outward series $f_a$, as illustrated for example under reference 800A in FIG. 2. According to another variant not shown FIG. 2, the detected information can be detected on the retentate, for example on leaving the outward series $f_a$ or the return series $f_b$ of filtering elements. Under the description, and as follows from FIGS. 3A, 3B and 3C and the description thereof given below, the term "channel" is to be construed in its broadest meaning and may, in some cases, correspond to circulation chambers.

Figure 3A:
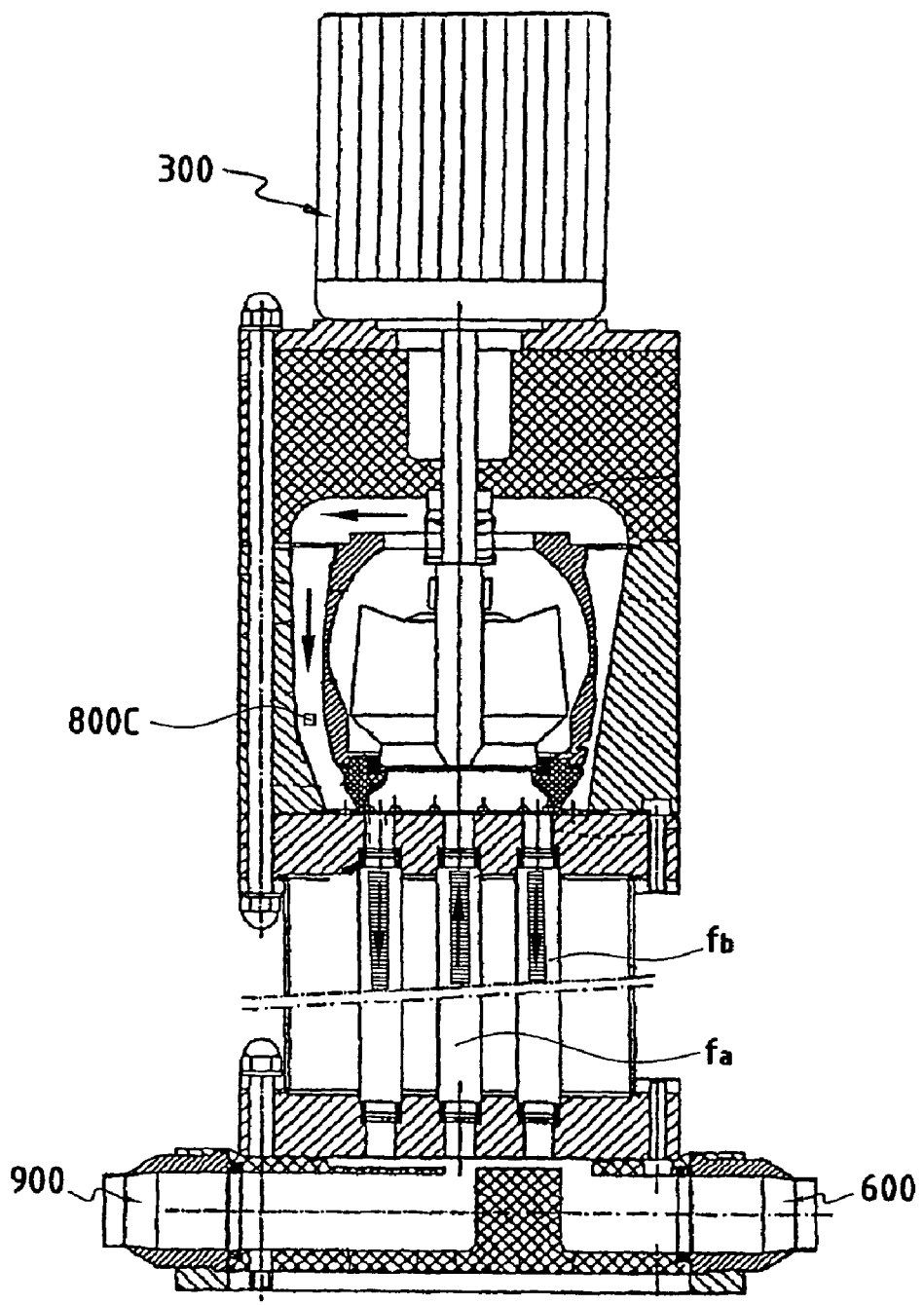
FIGS. 3A, 3B and 3C are cross-sectional views of TIS-type devices conforming to the invention.
Figure 3B:
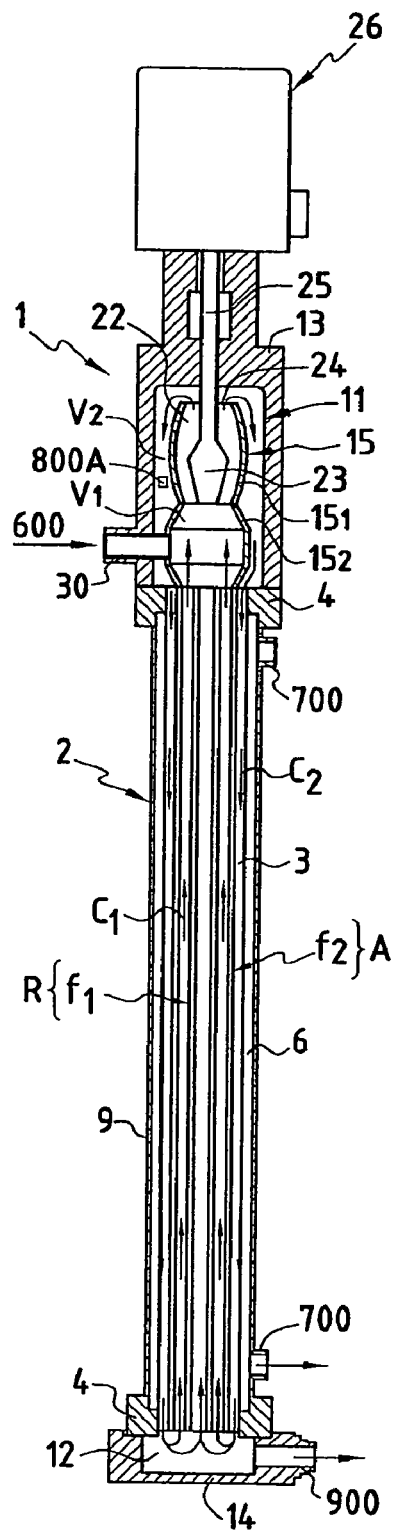
Figure 3C:
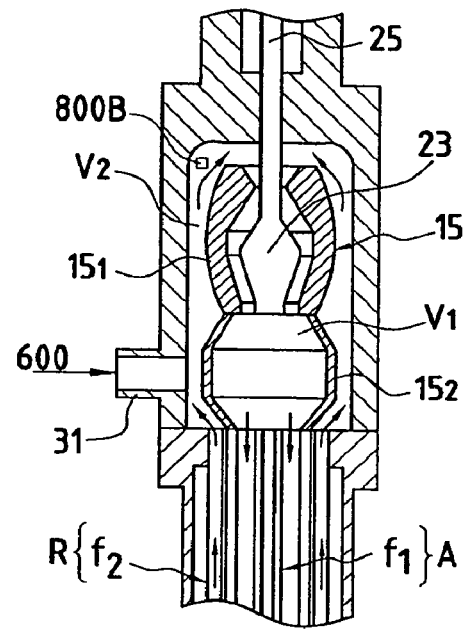

FIGS. 3A, 3B and 3C, in which some references of FIG. 2 have been reproduced, are cross-sectional views of TIS-type devices in which a detection probe has been arranged. In the variant illustrated FIG. 3A which corresponds to the device described in WO 01/96003 in FIG. 3 thereof, the evacuation outlet 900 for part of the retentate is positioned after the return series $f_b$ of filtering elements. In the device illustrated FIG. 3A, the turbine 300 is positioned downstream of the outward series $f_a$ of filtering elements and upstream of the return series $f_b$. The probe 800C detects information on the retentate and is positioned after the outward series $f_a$ of filtering elements, between the turbine 300 and the return series $f_b$ of filtering elements. FIGS. 3B and 3C, with respect to the relative positioning of the pump 300 and the evacuation outlet 900 for part of the retentate, correspond to the schematic illustration given FIG. 2.

Said device may have a drawback under certain operating conditions. On the principle that the value of pressure drop in each outward or return circuit, related to the rate of circulation of the liquid, equals ΔP, the circulator pump adds twice the pressure loss (outward and return circuit) to the value of the feed pressure Pa to ensure circulation of the liquid in the circulation loop. The pressure at the exit from the outward circuit, which also corresponds to suction of the circulator pump, equals Pa−ΔP. On the discharge side of the circulator pump, the pressure equals Pa+ΔP. It is to be noted that the pressure on suction equals Pa−ΔP. Therefore, in relation to the values of Pa and ΔP, said pressure on suction may assume a negative value, which means that the filtering elements may aspirate filtrate. The result is an inevitable loss of yield on the quantity of filtered liquid.

Said disadvantage can be solved using the device shown FIGS. 3B and 3C which will now be described in detail.

In the device 1 shown FIG. 3B, the filtering elements 3 at each of their ends are mounted on a positioning plate 4 mounted inside a casing 2. Each positioning plate 4 conventionally comprises a through hole through which the end of a tubular filtering element 3 can be passed. Each hole is equipped with a seal to allow the sealed mounting of the filtering elements 3 on the positioning plates 4. The positioning plates 4 together with the casing 2, define a collection space 6 for the filtrate leaving the peripheral surface of the filtering elements 3. This collection space 6 communicates via at least one, and in the illustrated example via two evacuation outlets 700 for the filtrate. In the illustrated example, each filtrate outlet 700 consists of a channel section connected to a ferrule 9 which partly forms the casing 2 and at each end thereof the positioning plates 4 are mounted. Therefore the ferrule 9, with the positioning plates 4, delimits the collection space 6.

The filtration device 1 also comprises a first communication chamber 11 arranged in the casing 2 into which one of the ends of the filtering elements 3 leads beyond the positioning plate 4, whilst the other end of the filtering elements 3 leads into a second communication chamber 12 beyond the other positioning plate 4. As can be seen more clearly FIG. 3B, the first chamber 11 is delimited inside a closure box 13 connected to the ferrule 9 and/or to the positioning plate 4, whilst the second communication chamber 12 is delimited between the adjacent positioning plate 4 and a bottom closing part 14 mounted on the ferrule 9 and/or the positioning plate 4. Therefore the casing 2 consists of the ferrule 9, the box 13 and the bottom closing part 14.

The device 1 comprises separating means 15 mounted in the first communication chamber 11, so as to divide this first chamber firstly into a first volume $V_1$, communicating with a first series $f_1$ of filtering elements 3, through which the liquid to be treated passes in a first direction shown by the arrow $c_1$ and secondly into a second volume $V_2$ communicating with a second series $f_2$ of filtering elements 3 through which the liquid passes in a second direction $c_2$ opposite to the first direction $c_1$. The separating means 15 are mounted sealingly on the adjacent positioning plate 4, so as to divide the volume of the first chamber 11 into a first volume $V_1$ and a second volume $V_2$, respectively located inside and outside the separating means. It is to be appreciated that the filtering elements 3, belonging to the first series are different from the filtering elements 3 of the second series $f_2$. According to one preferred characteristic of embodiment, the separating means 15 are mounted so that the series $f_1$, $f_2$ of filtering elements 3 comprise a substantially equal number of filtering elements 3.

According to this example, the filtering elements 3, belonging to the first series $f_1$, are located inside the virtual shell extending the separating means 15, whilst the filtering elements 3, belonging to the second series $f_2$, are located outside this virtual shell. It is to be appreciated that the filtering elements 3 of the first $f_1$ and second $f_2$ series form the outward and return circuits of a circulation loop for the liquid to be treated, which is formed inside the casing. In the example illustrated FIG. 3B, the filtering elements of the second series $f_2$ form the outward circuit A, whilst the filtering elements of the first series $f_1$ form the return circuit R.

The separating means 15 innerly delimit a housing 22 for a turbine 23 of a circulator pump. The separating means 15, which are described in more detail in the remainder of the description, are of tubular or cylindrical shape and are mounted sealingly on the adjacent positioning plate 4. The separating means 15 innerly delimit the first volume $V_1$ and externally, with respect to the closure box 13, the second volume $V_2$. The closure box 13 can be secured to the positioning plate 4 via assembly means. The separating means 15 contain a communicating passageway 24 so that the liquid to be treated can pass between volumes $V_1$, $V_2$. The turbine 23 has a drive shaft 25, linked to a rotation drive motor 26 mounted on the closure box 13. Preferably, the drive shaft 25 is mounted in the alignment of the axis of the ferrule 9 in which the filtering elements 3 are evenly distributed along the axis of the ferrule. Evidently, the closure box 13 comprises a sealed passage for the drive shaft 25.

In the example illustrated FIG. 3B, it is considered that the motor 26 driving the pump operates in suction mode. The turbine is used firstly to suction the liquid derived from the membranes of the first series $f_1$ forming the return circuit, and secondly to discharge the liquid via the communication passage 24 and volume $V_2$, so as to supply the membranes of the second series $f_2$ forming the outward circuit of the circulation loop.

According to another characteristic of the object of the invention, the device 1 comprises an inlet 600 for the liquid to be treated, which opens into the first communication chamber 11 of the casing, between the turbine 23 of the circulator pump and the filtering elements 3 of the series forming the return circuit of the circulation loop, namely the filtering elements of the first series $f_1$ in the example illustrated FIG. 3B.

According to another advantageous characteristic, the second communication chamber 12 is arranged in the bottom closing part 14 which, in the illustrated example, is equipped with an evacuation outlet 900 for the retentate. The second communication chamber 12 is delimited by the adjacent positioning plate 4 and ensures communication between the filtering elements 3 of the second series $f_2$ and the filtering elements 3 of the first series $f_1$.

The functioning of the device 1, described FIG. 3B, arises directly from the preceding description. The liquid to be treated arrives via inlet 600 into volume $V_1$ and is suctioned under the action of the turbine 23 into the filtering elements 3 of the second series $f_2$ having previously entered into volume $V_2$, via the communication passageway 24. The liquid passes through the filtering elements 3 of the second series $f_2$ which therefore form the outward circuit A of the circulation loop, and arrives in the second communication chamber 12 to be distributed firstly towards the retentate evacuation outlet 900 and secondly, under the suction action of the turbine, through the filtering elements 3 of the first series $f_1$ which form the return circuit of the circulation loop. The liquid which has circulated through the filtering elements 3 of the first series $f_1$ is collected in volume $V_1$. The filtration cycle is continued according to the above description. In the example shown FIG. 3B, the probe 800A is positioned at volume $V_2$, downstream of the turbine 23 in the direction of circulation of the liquid, and upstream of the inlet into the filtering elements of the second series $f_2$ forming the outward circuit. Detection of information is therefore carried out on the liquid to be filtered. The probe positions previously described can also be provided.

In the example illustrated FIG. 3B, the inlet 600 for the liquid leads into volume $V_1$ of the first communication chamber 11, located inside the separating means. According to this exemplary embodiment, the inlet 600 comprises a tubular element 30 passing through the box 13, the volume $V_2$ of the communication chamber 11 and the separating means 15, and opening into volume $V_1$ delimited inside the separating means 15. According to one exemplary embodiment, the separating means 15 comprise a stator $15_1$ of tubular shape, inside which the turbine 23 is mounted. The separating means 15 also comprise a tubular body $15_2$ extending the stator $15_1$ and mounted sealingly on the adjacent positioning plate 4 but also on the stator $15_1$. Preferably, this tubular body $15_2$ is provided with a metal lining on which the turbine bears. This lining therefore ensures the seal between the stator and the tubular body, as well as rotation of the turbine. The tubular body $15_2$ is of sufficient height to allow mounting of the tubular element 30 which is mounted radially on the tubular body $15_2$. The tubular element 30 therefore leads to inside the tubular body $15_2$, between the exit of the filtering elements 3 of the first series $f_1$ and the turbine 23 inside the separating means 15 i.e. in the first volume $V_1$.

The tubular element 30 is therefore accessible from outside the casing, so that it can be connected to a connector conduit. It is to be noted that the tubular body $15_2$ can be provided with a mounting collar bearing on the inner wall of the box 13. This collar which extends radially between the tubular body $15_2$ and the box 13, is provided with passageways for the liquid circulating inside volume $V_2$.

In the preceding example, the pump suctions the liquid through the filtering elements of the first series $f_1$ and discharges the liquid through the filtering elements of the second series $f_2$. Evidently, by reversing the direction of rotation of the turbine, provision can be made for suction through the filtering elements 3 of the second series $f_2$ and for discharge of the liquid through the filtering elements 3 of the first series $f_1$.

According to this variant of embodiment illustrated FIG. 3C, the filtering elements 3 of the first series $f_1$ are supplied by the first volume $V_1$ thereby forming the outward circuit A of the circulation loop. At the exit from the filtering elements 3 of the first series $f_1$, the liquid is distributed firstly towards the evacuation outlet S for the retentate, and secondly towards the filtering elements 3 of the second series $f_2$ which form the return circuit R. The liquid enters into the second volume $V_2$ on leaving the filtering elements 3 of the second series $f_2$.

In this example of embodiment, the inlet 600 for the liquid leads into the second volume $V_2$, i.e. between the turbine 23 and the filtering elements 3 of the second series $f_2$ forming the return circuit R of the circulation loop. Hence, the liquid of the second volume $V_2$, derived from inlet 600 and the outlet of the filtering elements of the second series $f_2$, is suctioned by the turbine 23 via the communication passageway 24.

In this exemplary embodiment, the inlet 600 for the liquid to be treated leads into volume $V_2$, outside the separating means 15. In this embodiment the inlet 600 comprises a tubular connector 31 passing through the box 13 so that it is accessible from outside the casing and leads to outside the separating means 15. In the illustrated example, the separating means 15 comprise the stator $15_1$ and the tubular body $15_2$. It is to be noted that the tubular body $15_2$ can be omitted in this variant of embodiment.

In the example illustrated FIG. 3B, the retentate evacuation outlet 900 communicates with the second communication chamber 12. It is to be noted that this retentate evacuation outlet 900 can be arranged to communicate with the first communication chamber 11 into which inlet 600 for the liquid to be treated also leads. In the example illustrated FIG. 3B, the retentate evacuation outlet 900 may pass through either the box 13, to lead into the second volume $V_2$, or through the box 13 and the tubular body $15_2$ to lead into the first volume $V_1$ whether or not opposite the inlet 600. In the example illustrated FIG. 3C, the retentate evacuation outlet 900 may pass through the box 13 to lead into the second volume $V_2$, whether or not opposite inlet 600.

In the exemplary embodiment shown FIG. 3C, the probe 800B is positioned at volume $V_2$, upstream of the turbine 23, in the direction of circulation of the liquid. Here again, the previously described positions of the probe may also be provided.

The examples below allow better illustration and comprehension of the invention, but are in no way limiting.

EXAMPLE 1

Monitoring Using Density

An installation, integrating a device such as described in patent application WO 01/96003 and marketed by SIVA under the trade name TIS (abbreviation for "Tangential Integrated System"), is equipped with a probe of MOBREY trademark, type MCU 200.

A MOBREY probe of MCU 200 type is arranged in that part of the installation lying on the discharge side of the circulator pump, just at the inlet of the device comprising the membrane module (reference 800 C) as illustrated FIG. 3A.

The liquid used is red wine. The advantage of the TIS device is that it is possible to achieve high concentrations (low capture volume) and to limit heating since the residence time of the wine inside the device is very short.

The advantage of high concentrations is to increase global filtration yield. Additionally, since the dead volume is very small, only a small volume of residual concentrate is produced, on stoppage of the installation. The TIS commonly achieves yields of 99% for wine filtration.

Two wines were tested:

a wine of type 1a corresponding to a wine retentate after filtration and previously concentrated by a concentration factor of 300, a wine of type 1b corresponding to a retentate of red wine from a different grape to the first and previously concentrated by a concentration factor of 300 during the filtering operation.

Figure 4:
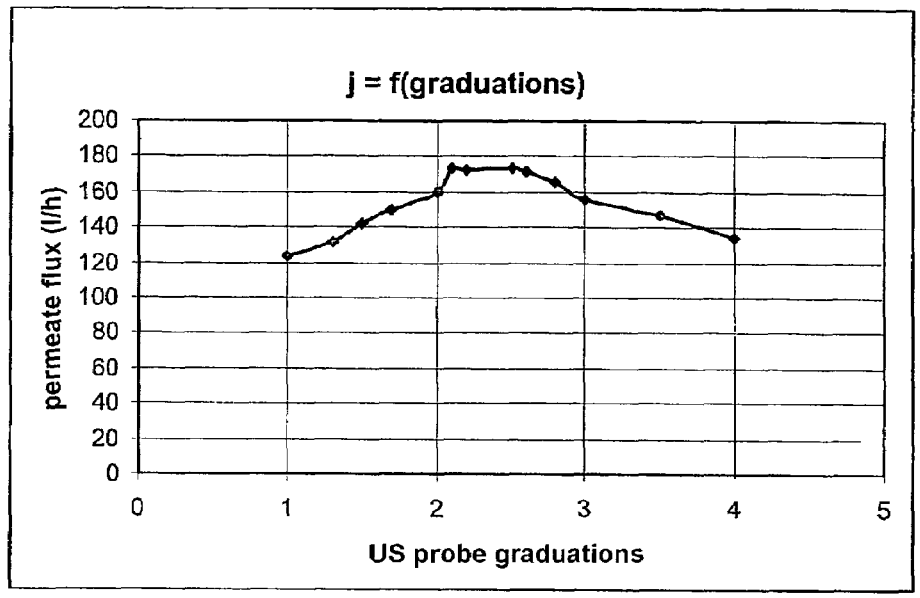
FIGS. 4 to 7 show changes in permeability of a TIS-type device operating in tangential mode, in relation to the signal given by a probe integrated in the device of the invention.

The type 1a wine was placed in the TIS system following the recommended conditions of use of the system. The probe indicates the density levels of the liquid to be filtered before it is added to the filtration module. The curve given in FIG. 4 shows the variations in permeate flux in relation to the indications given by the probe.

It is observed that the permeate flux increases up to a value defined by 3.5 graduations of the MOBREY probe, and then decreases. At this value, the concentration factor achieved in the TIS installation is 4.6, which corresponds to a final concentration factor of 300*4.6=1380. The wine is therefore concentrated 1380 times by the membrane installation. The yield for this concentration equals 1379/1380=99.92%. At a value of 5, the installation is stopped on account of the high risk of gelling. In this case, the concentration factor of the TIS system is 7.1, which corresponds to a final concentration factor of 2130. For information purposes, the total yield is 99.95%.

The type 1b wine was also placed in the TIS installation following the recommended conditions of use of the system. The probe indicated the density levels of the liquid to be filtered before it was added to the filtration module.

Figure 5:
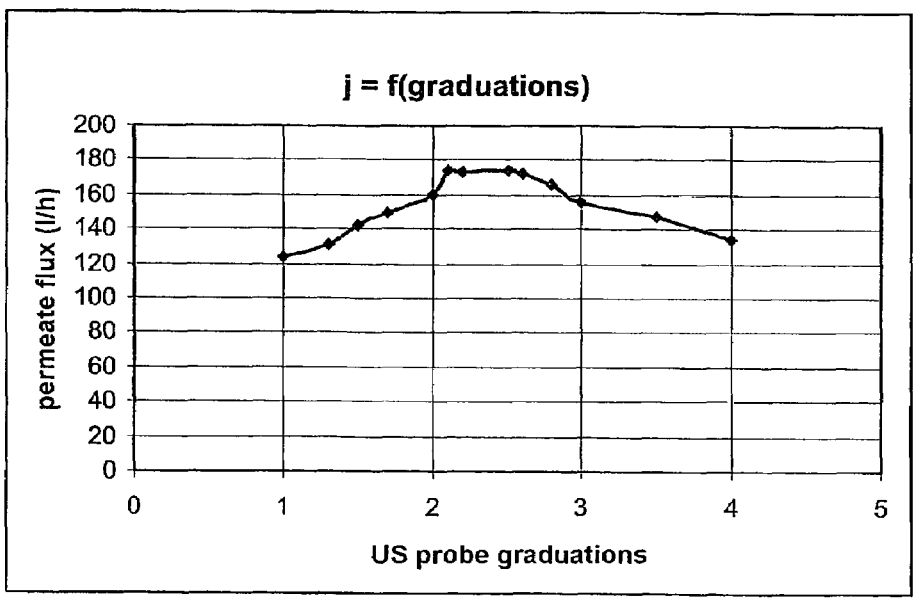

The curve given FIG. 5 shows the variations in permeate flux in relation to the indications given by the probe. As with the wine of type 1a, a maximum is observed with an indicated probe value of 2.5. This wine therefore has much greater fouling properties than the first. With this probe value, the concentration factor obtained in the TIS installation is 4.2.

The final concentration is therefore 300*4.2=1320. In this case, the yield of the filtration operation equals 99.92%.

At a probe value of 4, the installation was stopped and no gelling was observed. At this probe value, the concentration factor is 7.0. The final concentration factor is therefore 2100.

For both types of wine, the probe allows density values to be detected on and after which the permeate flux decreases.

For the type 1a wine, this value corresponds to a probe indication of 3.5, and for the type 1B wine to an indication of 2.5. Taking into account the results obtained with these two wines, it is possible, for the family of red wines corresponding to the wines of type 1a and 1b, to define an alert measurement for the probe at a value of 2, on and after which the installation is stopped to ensure:

the non-onset of any risk of gelling in the system. The installation can therefore be drained without any difficulty, that the value of permeate flux remains below a critical value on and after which the flow rate decreases, very high yield at all times.

EXAMPLE 2

Monitoring Using Circulation Rate

In this example, the TIS device used is modified compared with patent application WO 01/96003 as follows:

the feed point of the product to be treated is moved and positioned between the exits from the membranes and the suction side of the circulator pump;

the direction of rotation of the circulator pump is modified so that suction is applied from the membranes located on the peripheral part of the casing.

The device corresponds to the one in FIG. 3C. The probe used is based on measurement of the travel time of an ultrasound wave inside a liquid. The probe used is a flow rate controller marketed by IFM and is equipped with 10 diodes numbered 0 to 9. The more the number of diodes light up, the faster the flow rate.

The probe was calibrated for flow rate by using a conventional flow meter to determine the relationship between the flow rate and the number of diodes lit up. This calibration was made on water.

The table below gives this matched relationship.

| Lit Diodes | Flow rate (m$^3$/h) |
| --- | --- |
| 9 | 7 |
| 9 | 6 |
| 9 | 5 |
| 9 | 4 |
| 8 | 3.8 |
| 8 | 3 |
| 7 | 2.5 |
| 7 | 2 |
| 6 | 1.8 |
| 5 | 1.5 |
| 5 | 1.3 |
| 4 | 1.15 |
| 3 | 1 |
| 2 | 0.73 |
| 1 | 0.59 |
| 0 | 0.4 |

The probe is arranged on the channel located at the suction side of the circulator pump (position 800 B), as shown FIG. 3C.

Since the cross section of this channel is known, it is possible to determine the flow rate inside this channel, then the rate of circulation of the liquid inside the membranes.

Two tests were conducted with two different wines called 2a and 2b, on this installation incorporating this probe whose transmitted signal is characteristic of the velocity of the liquid to be filtered. These two wines correspond to wine concentrates obtained during filtering operations. The respective concentration factors of these concentrates are 450 and 500.

Figure 6:
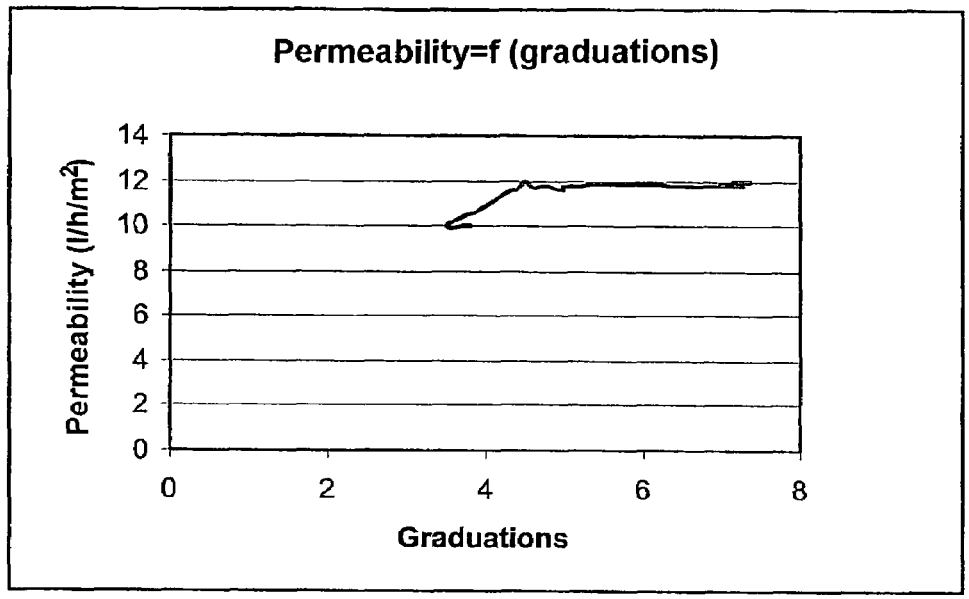

For wine 2a, the curve given FIG. 6 was obtained, which shows the variations in permeability of the membrane in relation to the number of lit diodes. It is observed that permeability practically does not vary for as long as at least five diodes are lit. Below this number, permeability decreases.

As soon as only 4 diodes were lit, the installation was stopped, rinsed with water and the membranes dismounted. Examination of the membranes showed that a certain number of channels were clogged. Any continued concentration would have led to complete fouling of the channels. Hence the choice of a number of 5 lit diodes as maximum concentration value without any risk of fouling. The concentration factor at the point corresponding to 5 lit diodes is 2.5. The total concentration of the wine is therefore 450×2.5 i.e. 1125. The total yield is therefore 99.9% which is a very high value.

Figure 7:
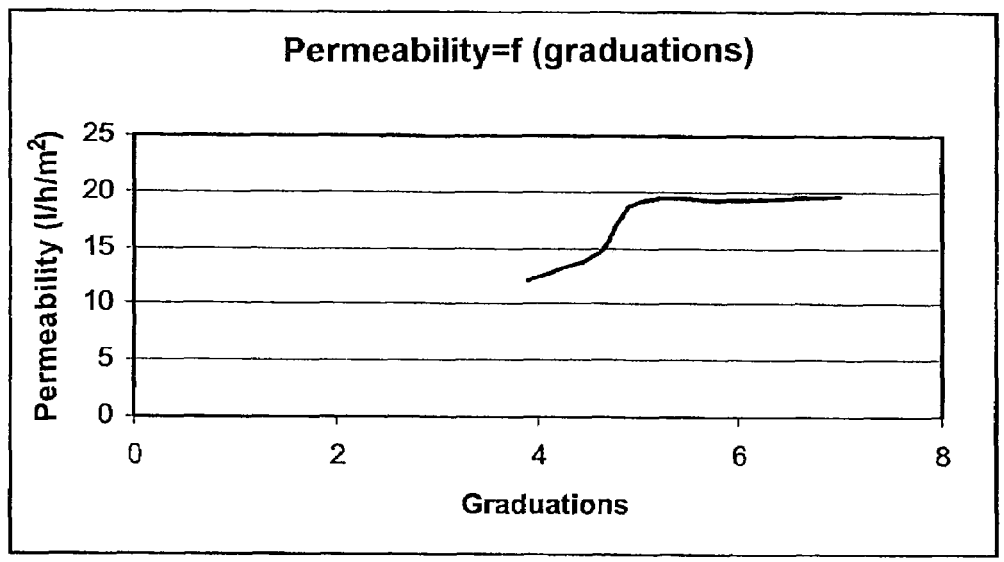

For wine 2b, the curve given FIG. 7 was obtained, which represents the variations in permeability of the membrane in relation to the number of lit diodes. Almost the same behaviour is observed as with wine 2a. Permeability is effectively independent of the number of diodes lit up for as long as at least 5 diodes remain lit. Thereafter, permeability undergoes a sudden drop.

Here again, the installation was stopped when only 4 diodes were lit up, and the installation was rinsed with water and the membranes dismounted. Examination of these membranes showed that a certain number of channels were clogged. Continued concentration would have resulted in complete fouling of the channels. Hence the choice of 5 lit diodes as alert value, in order to avoid any risk of membrane fouling. The concentration factor corresponding to the point at which the number of lit diodes changes from 6 to 5 is 1.5.

The total concentration of the wine is therefore 500×1.5 i.e. 750. Total yield is 99.8%, which is also a very high value.

As with the probe detecting a measured characteristic of the density of the liquid to be filtered, the use of a probe which gives information on the circulation rate allows the selection of a maximum concentration point over and above which there is a major risk of membrane fouling or gelling of the liquid.

Evidently, the results obtained in above examples 1 and 2 on an installation integrating a tangential filtration device of TIS type can be transposed to a filtration installation incorporating a conventional circulation loop. The only difference is the operating temperature which is higher with a conventional loop, resulting in lower viscosity and hence the possibility to continue concentration over a longer time.

The invention claimed is:

1. Device for tangential filtration of a liquid to be treated intended to be separated into a filtrate and a retentate, comprising:
    at least one filtering element which comprises at least one inlet for the liquid to be filtered, at least one outlet for the filtrate which has passed through the filtering element, and at least one outlet for the retentate which has circulated along the filtering element, said element being incorporated in a circulation loop so that at least part of the retentate is reinjected into the liquid to be treated before it enters the filtering element,
    a circulation pump whose turbine is integrated in the circulation loop,
    a filtration module, named casing 2, in which the circulation loop is integrated consisting of an outward series ($f_a$) and a return series ($f_b$) of filtering elements forming outward (A) and return (R) circuits, and which comprises:
        at least one inlet (600) for the liquid to be treated,
        at least one evacuation outlet (900) for the retentate, a series of filtering elements (3) of tubular shape extending parallel to each other and, at least on their ends, passing sealingly through a positioning plate (4), the filtering elements (3) each comprising at least one circulation channel for the liquid to be treated and ensuring the filtration of said liquid, with a view to obtaining the outgoing filtrate on a peripheral surface of the filtering elements, the filtrate intended to be collected in a collection space (6) located between the positioning plates (4) and the casing (2),
        at least one outlet (700) for the filtrate communicating with the collection space (6) for the filtrate,
        a first communication chamber (11) into which one of the ends of the filtering element leads, and in which separating means (15) are mounted, in sealed contact with the adjacent positioning plate (4) to divide said chamber into first (V1) and second (V2) volumes respectively delimited inside and outside the separating means and respectively communicating with a first series (f1) and a second series (f2) of filtering elements (3) forming outward (A) and return (R) circuits of a circulation loop for the liquid to be treated, the separating means comprising a communication passageway (24), between the second volume (V2) and first volume (V1), inside which a turbine (23) of a circulator pump is mounted and provided with a drive shaft (25) extending outside the first chamber (11) for connection to a driving motor (26), and
        a second communication chamber (12) into which the other end of the filtering elements leads, ensuring communication for the liquid to be treated between the filtering elements of the first series (f1) and those of the second series (f2),
        the inlet (600) for the liquid to be treated leading into the first communication chamber (11) of the casing between the turbine (23) of the circulation pump and the filtering elements (3) of the series forming the return circuit (R) of the circulation loop,
    at least one probe to detect information characteristic of the liquid to be filtered, and representing risks of gelling of the liquid to be filtered in the filtering element(s) and/or risks of total fouling of the filtering element(s).

2. Device according to claim 1, characterized in that the motor driving the pump is driven so that the filtering elements (3) of the second series ($f_2$), supplied by the second volume ($V_2$) form the outward circuit, whilst the filtering elements (3) of the first series ($f_1$), leading into the first volume ($V_1$), form the return circuit, and in that the inlet (E) for the liquid to be treated leads into the first volume ($V_1$) of the first chamber (11) between the exit from the filtering elements of the first series ($f_1$) and the turbine (23) mounted inside the separating means (15).

3. Device according to claim 1, characterized in that the motor driving the pump is driven so that the filtering elements (3) of the first series ($f_1$), supplied by the first volume ($V_1$), form the outward circuit, whilst the filtering elements (3) of the second series ($f_2$), leading into the second volume ($V_2$), form the return circuit, and in that the inlet (E) for the liquid to be treated leads into the second volume ($V_2$) of the first chamber delimited outside the separating means (15) between the exit from the filtering elements (3) of the second series ($f_2$) and the turbine (23) mounted inside the separating means (15).

4. Device according to claim 1, characterized in that the inlet (600) for the liquid to be treated comprises a tubular element (30) so as to lead to inside the separating means (15).

5. Device according to claim 1, characterized in that the inlet (600) for the liquid to be treated comprises a tubular connector (31) so as to lead to outside the separating means (15).

6. Device according to claim 1, characterized in that the probe (800A) is positioned at the first volume ($V_1$), downstream of the turbine (23), in the direction of circulation of the liquid, and upstream of the entry into the filtering elements of the second series $f_2$ forming the outward circuit.

7. Device according to claim 1, characterized in that the probe (800B) is positioned at the second volume ($V_2$), upstream of the turbine (23), in the direction of circulation of the liquid.

8. Device according to claim 1, characterized in that it comprises means to compare the detected information with a threshold value used to assess the risk of gelling of the liquid to be filtered inside the filtering element(s) and/or the risk of complete fouling of the filtering element(s).

9. Device according to claim 8, characterized in that it comprises means to trigger safety procedure in relation to the results of the comparison.

10. Device according to claim 1, characterized in that the probe detects information on the concentration, the viscosity, the density and/or the rate of circulation of the liquid to be filtered.

11. Device according to claim 1, characterized in that the probe detects information on the density of the liquid to be treated.

12. Device according to claim 1, characterized in that the probe detects information on the rate of circulation of the liquid to be treated.

13. Device according to claim 1, characterized in that the probe provides information obtained from a measurement taken on the retentate.

14. Device according to claim 1, characterized in that the probe gives information obtained from a measurement taken on the liquid to be filtered.

15. Device according to claim 1, characterized in that the probe is an ultrasound probe.

* * * * *